US006278595B1

(12) United States Patent
Xue et al.

(10) Patent No.: US 6,278,595 B1
(45) Date of Patent: Aug. 21, 2001

(54) MAGNETORESISTIVE SENSOR HAVING A HARD-BIASING MATERIAL AND A CUBIC-TITANIUM-TUNGSTEN UNDERLAYER

(75) Inventors: Song Sheng Xue, Edina, MN (US); Bogdan Marius Simion, Pleasanton, CA (US); James Frank Dolejsi, Chanhassen; Patrick Joseph Ryan, St. Paul, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/237,361

(22) Filed: Jan. 26, 1999

Related U.S. Application Data

(60) Provisional application No. 60/072,766, filed on Jan. 27, 1998.

(51) Int. Cl.[7] .............................. G11B 5/39; G11B 5/127; G11B 5/33
(52) U.S. Cl. ........................................................ 360/327.31
(58) Field of Search .................. 360/327.31, 327.22, 360/FOR 213

(56) References Cited

U.S. PATENT DOCUMENTS

| 5,434,826 | 7/1995 | Ravipati et al. ................... 367/140 |
| 5,491,600 | 2/1996 | Chen et al. .......................... 360/322 |
| 5,495,378 | * 2/1996 | Bonyhard et al. ............... 360/327.31 |
| 5,876,843 | * 3/1999 | Ishiwata ................................ 428/209 |
| 5,959,810 | * 9/1999 | Kakihara et al. ............... 360/324.12 |

* cited by examiner

Primary Examiner—Robert S. Tupper
Assistant Examiner—Julie Anne Watko
(74) Attorney, Agent, or Firm—Kinney & Lange, P.A.

(57) ABSTRACT

The present invention is a magnetoresistive (MR) sensor that combines a hard-biasing material with an underlayer of cubic-titanium-tungsten to improve the stability of the MR sensor. The permanency of the hard-biasing material affects both the transverse and longitudinal biasing of the MR sensor, which in turn affects the stability of the MR sensor. The stability of the hard-biasing material is improved by combining it with an underlayer of cubic-titanium-tungsten. The underlayer enhances the hard-biasing material by improving the longitudinal magnetic anisotropy, the coercivity, and the in-plane squareness of the hard-biasing material. The combination of hard-biasing material and cubic-titanium-tungsten underlayer can be used in a variety of MR sensor embodiments, specifically an abutted junction or an overlaid structure. The method of making the abutted junction or overlaid structures is also improved by using cubic-titanium-tungsten as the underlayer of the hard-biasing material. The cubic-titanium-tungsten underlayer can be deposited at temperatures which are normal for the manufacturing of MR sensors, thus extra process steps are not needed. In addition, the process is more consistent and reliable.

12 Claims, 5 Drawing Sheets

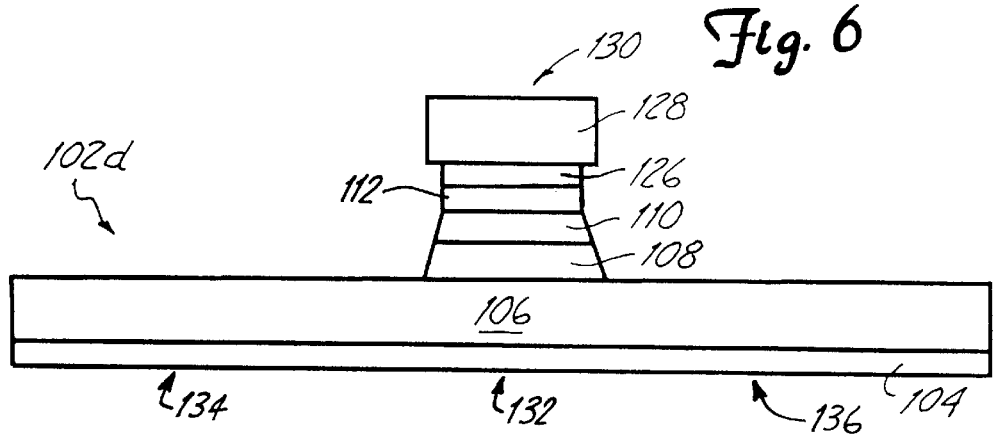
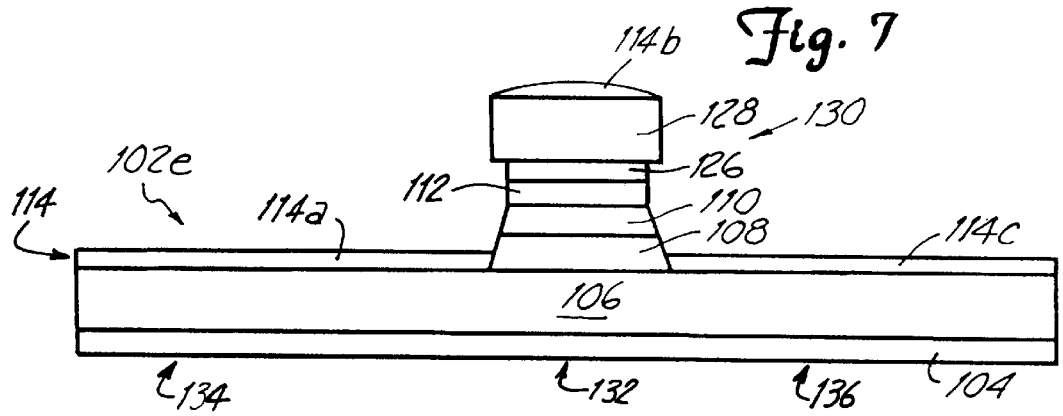
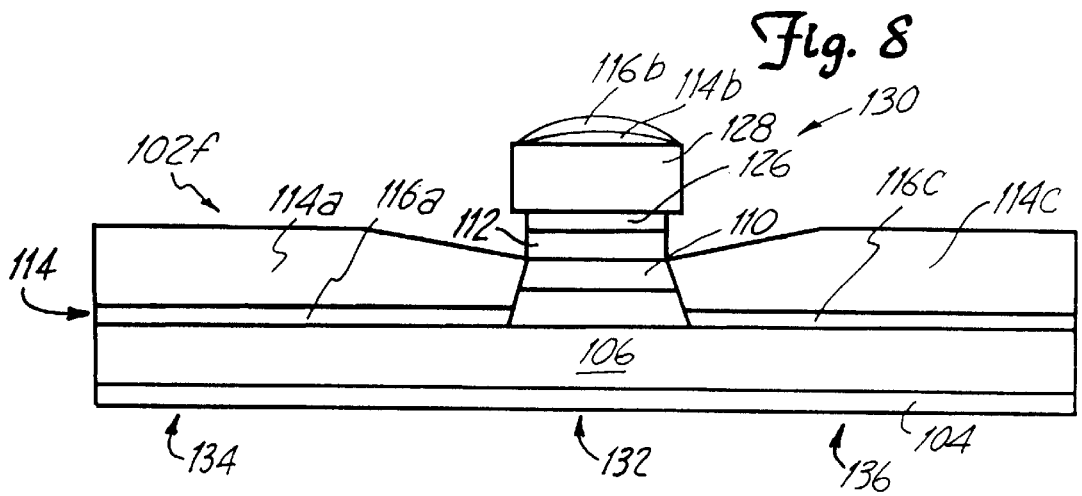

MAGNETORESISTIVE SENSOR HAVING A HARD-BIASING MATERIAL AND A CUBIC-TITANIUM-TUNGSTEN UNDERLAYER

CROSS-REFERENCE TO RELATED APPLICATION(S)

This Application claims the priority benefit of Provisional U.S. Patent Application Serial No. 60/072,766, filed Jan. 27, 1998.

BACKGROUND OF THE INVENTION

The present invention relates generally to a magnetoresistive (MR) sensor. More specifically, the present invention relates to an MR read sensor and a method of fabricating the MR sensor that combines a hard-biasing material with a cubic-titanium-tungsten underlayer, which improves the stability of the MR sensor.

Magnetoresistive (MR) sensors utilize an MR element to read magnetically encoded information from a magnetic medium, such as a disc, by detecting magnetic flux stored on the magnetic medium. An MR sensor must be properly biased in both the longitudinal and transverse directions to maintain the sensor in its optimal operating range so that it can properly detect the magnetic flux. This dual biasing is established through various combinations of magnetic exchange coupling or magnetostatic coupling of various layers within the MR sensor.

The three critical layers of an MR sensor are the MR element layer, a spacer material layer, and a soft adjacent layer (SAL). The MR element has magnetoresistive properties and low resistivity and generates an output voltage when a sense current flows through the layer. The output voltage varies in the presence of magnetic flux from a storage medium. The SAL is a magnetic bias layer with high resistivity. The SAL provides transverse biasing of the magnetization of the MR element. The spacer material has non-magnetic properties and high resistivity and functions as a spacer between the MR element and SAL. The spacer material helps break the exchange coupling between the MR element and the SAL, which allows the magnetic layers to act as two distinct layers, rather than one strongly coupled layer. Hard-biasing material is placed on each end of the MR sensor to establish longitudinal biasing of the MR element and form two passive regions of the sensor. The space between the passive regions maintains the transverse biasing and is referred to as the active region of the sensor.

MR and SAL elements can "fracture" into multiple magnetic domains when they are exposed to an external magnetic field. To maximize the stability and output of the MR sensor, it is desirable to maintain the MR and SAL elements in a single domain state. Three methods for maintaining the MR and SAL elements in a single domain state are magnetostatic coupling, ferromagnetic exchange coupling, and antiferromagnetic exchange coupling. Magnetostatic coupling is accomplished by positioning a hard-biasing material or permanent magnet adjacent to the MR element. This type of stabilization scheme is known as an abutted junction scheme. Exchange coupling is accomplished by depositing a ferromagnetic or antiferromagnetic layer adjacent to the MR layer so that one of the magnetic lattices of the deposited magnetic layer couples with the magnetic lattice of the MR element layer to preserve the single domain state of the sensor. This type of stabilization is referred to as an overlaid structure.

In existing MR sensors, alignment tolerances between various thin film layers and MR sensor mask features are critical. The alignment tolerances in many prior art MR sensor designs greatly increases the complexity of processing because critical geometries frequently require additional and/or more difficult processing steps. Additional processing steps increase the variance and contamination of the various thin film layers.

In the passive region of the sensor, for example, the hard-biasing material is inherently sensitive to the crystal texture of the underlayer and to the cleanness and/or roughness of the film interface. One prior art MR structure deposits the MR element first and then deposits the hard-biasing material on top of the MR element in the passive regions of the sensor. The MR element must be sputter-etched to remove a portion of the MR element in order to establish a proper underlayer for the hard-biasing material. This process is expensive and can be hard to control. A second MR structure deposits a separate material, such as Sendust, as an underlayer for the hard-biasing material. The hard-biasing material, however, is still very sensitive to the film interface. This sensitivity affects the stability of the hard-biasing material and in turn the biasing of the MR element.

A third MR structure deposits Chromium as the underlayer for the hard-biasing material. Chromium, however, must be deposited at elevated substrate temperatures to achieve the proper texture to bond with the hard-biasing material. Depositing Chromium at elevated sputtering temperatures has severe limitations in a volume production environment.

Therefore, there is a continuing need for an underlayer that can both improve the stability of the hard-biasing material and be deposited at normal sputtering temperatures.

BRIEF SUMMARY OF THE INVENTION

The present invention is a magnetoresistive (MR) sensor that has improved stability by combining the hard-biasing material with a cubic-titanium-tungsten underlayer. The permanency of the hard-biasing material affects both the transverse and longitudinal biasing of the MR sensor, which in turn affects the stability of the MR sensor. The hard-biasing material is improved by combining it with an underlayer made of cubic-titanium-tungsten. The underlayer enhances the hard-biasing material by improving the longitudinal magnetic anisotropy, the coercivity, and the in-plane squareness of the hard-biasing material.

A method of making an NR sensor with an abutted structure and a cubic-titanium-tungsten underlayer comprises depositing a soft adjacent layer (SAL) on top of a gap layer. A spacer material is deposited on top of the SAL and the MR element is deposited on top of the spacer material. A mask is placed over the central active region of the NM element, spacer material, and SAL. The MR element, spacer material, and SAL are removed in the areas not covered by the mask. A cubic-titanium-tungsten underlayer is deposited in the areas where the MR element, spacer material, and SAL were removed. A hard-biasing material is deposited on top of the cubic-titanium-tungsten underlayer. The mask is removed and a cap layer is deposited on top of the MR element in the active region and on top of the hard-biasing material in the passive regions of the sensor. Contacts are placed on top of the cap layer in the passive regions of the sensor.

In general, the MR sensor can use other structures, such as an overlaid structure, with cubic-titanium-tungsten as the underlayer of the hard-biasing material. The overlaid structure is similar to the abutted structure except that the MR element is deposited in both the active and passive regions of the sensor. All embodiments of the present invention use various structures of the MR sensor, but essentially cubic-titanium-tungsten is used as the underlayer of the hard-biasing material, which improves the stability of the hard-biasing material and the overall reliability of the MR sensor.

BRIEF DESCRIPTION OF THE DRAWINGS

FIGS. 2–11 are sectional views illustrating the process of forming an MR sensor in accordance with the present invention.

DETAILED DESCRIPTION

I. Prior Art MR Sensor 50

Figure 1:
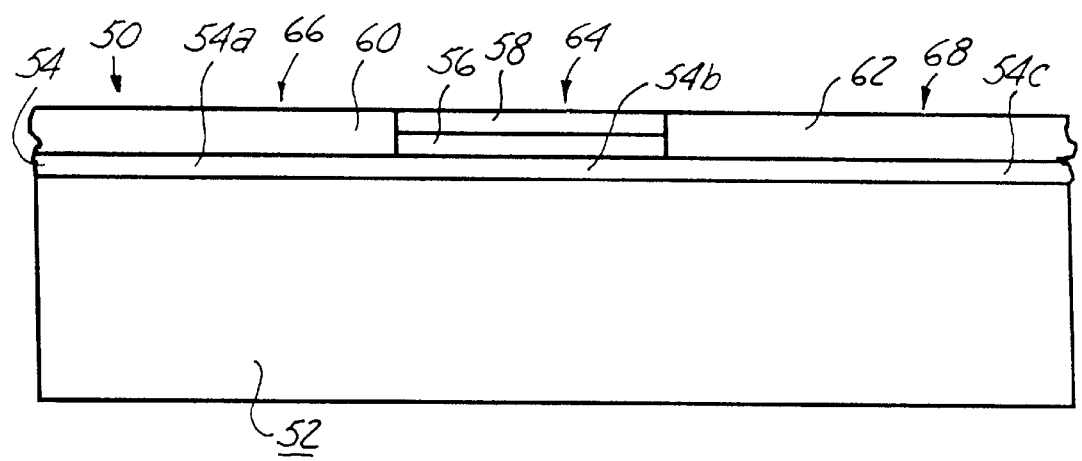
FIG. 1 is a sectional view of a prior art magnetoresistive read sensor in which the spacer and soft adjacent layers are positioned only in the central active region.

FIG. 1 is a sectional view of the reader portion of prior art magnetoresistive (MR) sensor 50. The sectional view shown in FIG. 1 is taken from a plane parallel to the air bearing surface of the sensor. In other words, the air bearing surface of MR sensor 50 is parallel to the plane of the page.

MR sensor 50 is positioned on top of substrate or gap layer 52 and includes MR element 54, spacer layer 56, soft adjacent layer (SAL) 58, and first and second permanent magnets or hard-biasing materials 60 and 62. MR element 54 includes first passive region 54a, second passive region 54c, and active region 54b, which is positioned between passive regions 54a and 54c. Hard-biasing material 60 is positioned at least partially on top of first passive region 54a. Likewise, hard-biasing material 62 is positioned at least partially on top of second passive region 54c.

Active region 64 of MR sensor 50 is formed between hard-biasing materials 60 and 62 and includes active region 54b of MR element 54, spacer layer 56, and SAL 58. First passive region 66 includes the portion of MR element 54 located in first passive region 54a and first hard-biasing material 60. Second passive region 68 includes the portion of MR element 54 located in second passive region 54c and second hard-biasing material 62.

Spacer layer 56 is positioned between hard-biasing materials 60 and 62 and on top of active region 54a of MR element 54. SAL 58 is positioned on top of spacer layer 56 such that SAL 58 is also located between hard-biasing materials 60 and 62. Hard-biasing materials 60 and 62 provide the boundaries of active region 64 and make contact with spacer layer 56 and SAL 58. Hard-biasing materials 60 and 62 also define the boundaries of the active region 54a of MR element 54.

During fabrication, prior art MR sensor 50 is subjected to various process steps which increase the variance and tolerances of each film layer. MR element passive regions 54a and 54c are sputter-etched to remove a small portion of MR element 54 in order to establish a clean surface or underlayer for later deposition of hard-biasing materials 60 and 62. These processing steps are costly and make it difficult to control the magnetic properties of hard-biasing materials 60 and 62. Thus, fabrication of a sensor such as sensor 50 is costly and may not be within predetermined tolerances.

II. Embodiments of the Present Invention

Figure 2:
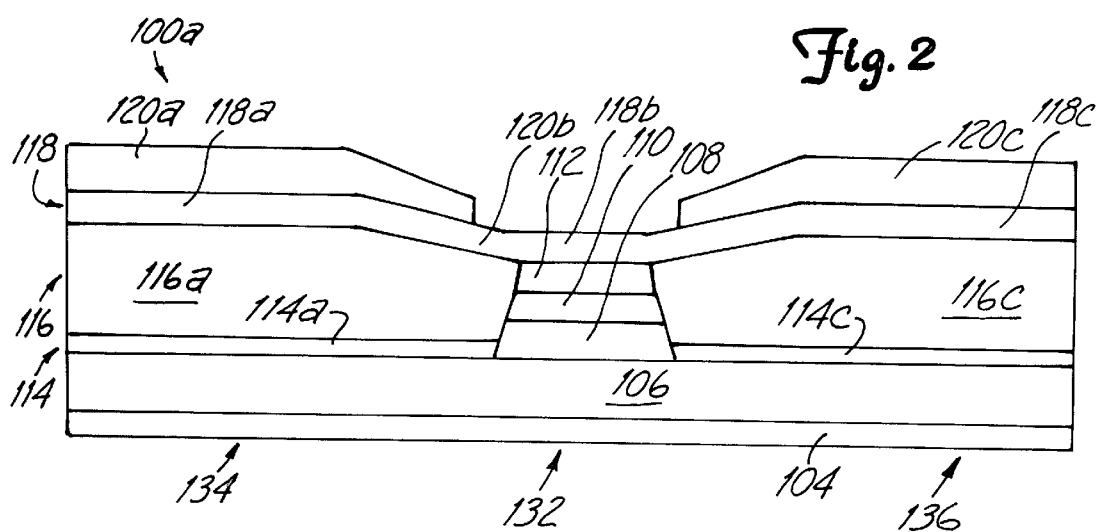
Figure 9:
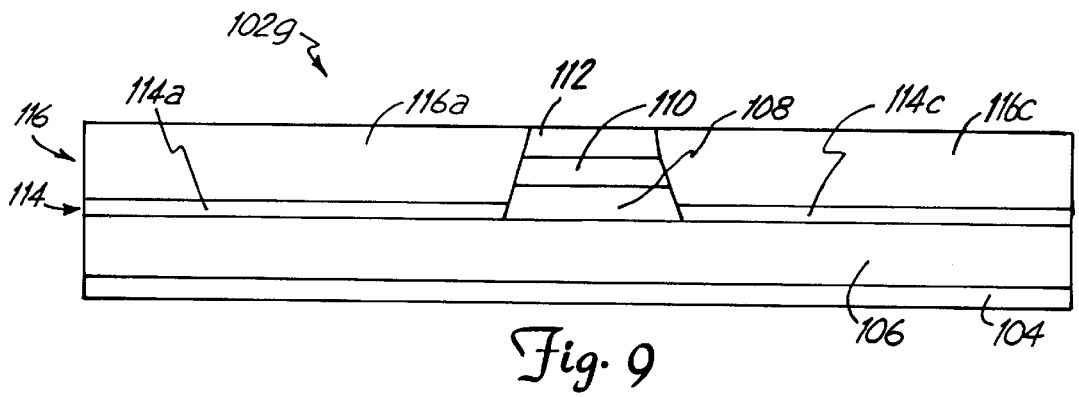
Figure 10:
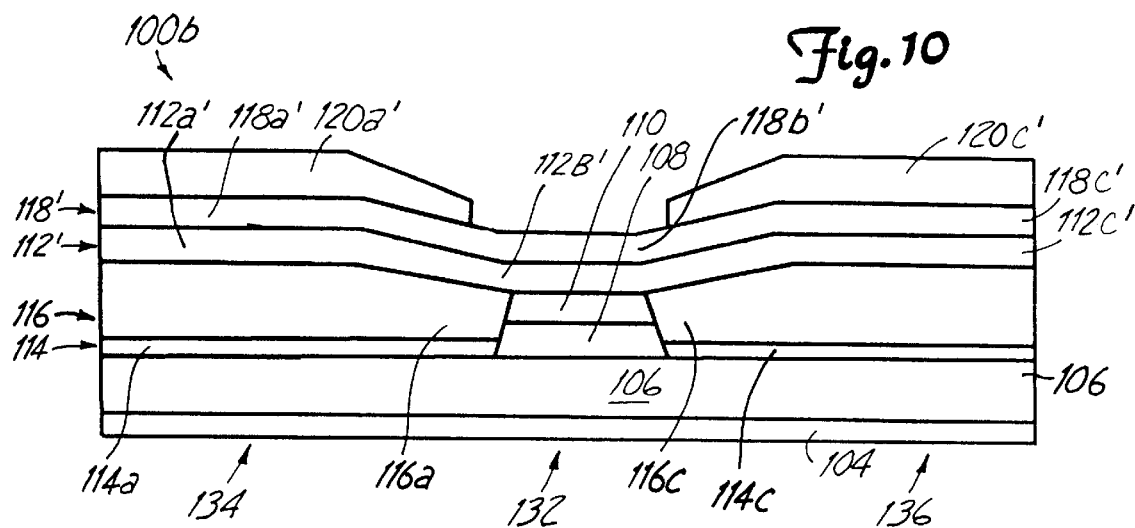

FIGS. 2–11 illustrate a process of forming MR sensor 100 according to the present invention. FIGS. 2 and 10 show completed MR sensor 100, where each figure discloses a different embodiment of the present invention. FIGS. 3–9 and 11 show structures 102a–102h at various phases of the fabrication of MR sensor 100. The cross-sectional views of FIGS. 2–11 are taken from a plane parallel to the air bearing surface of the sensor. In other words, as with FIG. 1, the air bearing surface of MR sensor 100 is in a plane parallel to the plane of the page.

A. First Embodiment

FIG. 2 is an example of an MR sensor using an abutted structure. As shown in FIG. 2, MR sensor 100a is positioned on top of gap layer 106, which is adjacent to bottom shield 104. MR sensor 100a includes soft adjacent layer 108, spacer layer 110, MR element 112, underlayer 114 (114a, 114c), first hard-biasing material 116 (116a, 116c), cap layer 118 (118a, 118b, 118c), and first and second contacts 120a and 120c. Active region 132 of MR sensor 100a is defined by SAL 108, spacer layer 110, MR element 112, and active regions 118b of cap layer 118. First passive region 134 of MR sensor 100a is defined by first passive regions 114a, 116a, and 118a of underlayer 114, first hard-biasing material 116, and cap layer 118, respectively, and first contact 120a. Second passive region 136 of MR sensor 100a is defined by second passive regions 114c, 116c, and 118c of underlayer 114, first hard-biasing material 116, and cap layer 118, respectively, and second contact 120c.

Figure 3:
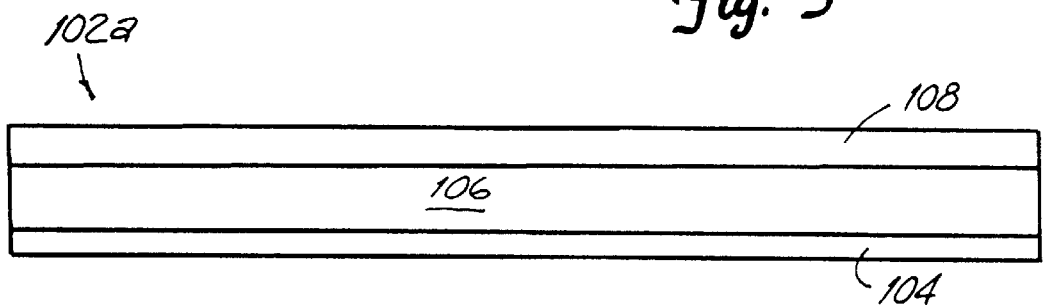

The first embodiment of making MR sensor 100, shown in FIGS. 2–9, discloses an MR sensor with an abutted structure. As shown in FIG. 3, SAL 108 is positioned on top of gap layer 106. Gap layer 106 is positioned between bottom shield 104 and SAL 108, where bottom shield 104 has a thickness in the range of 20–100 nano-meters and gap layer 106 has varying thicknesses. In preferred embodiments, bottom shield 104 is made of a Sendust, nickel—iron (NiFe) or cobalt-based amorphous and gap layer 106 is made of a non-magnetic, insulating material with good thermal properties.

SAL 108 is preferably a magnetic-bias layer of Sendust-type alloy which is made up of approximately 70 to 90% iron (Fe), up to 15% silicon (Si) and up to 15% aluminum (Al). Sendust-type alloys can also contain small amounts of additional elements, in dilute form, such as up to 5% titanium (Ti), chromium (Cr), vanadium (V), manganese (Mn), and/or zirconium (Zr), to name a few. The Sendust-type alloy forming SAL 108 can be formed in a variety of sputtering gases such as argon, neon, krypton, xenon and helium. SAL 108 can also be a layer of various ferromagnetic materials, for example nickel—iron—rhodium (NiFeRh), nickel—iron—rhenium (NiFeRe), or nickel—iron—chromium (NiFeCr), to name an additional few. SAL 108 can also be a layer of amorphous cobalt-based alloy such as cobalt—niobium—zirconium (CoNiZr) or cobalt—iron—niobium—tantalum (CoFeNbTa). In preferred embodiments, SAL 108 has a resistivity of greater than 100 $\mu\Omega$-cm to reduce current flow through the layer. SAL 108 has a preferred thickness of between 25 and 1000 Å and a saturation inductance of at least 3 kilo-Gauss to properly bias MR magnetic layer 112 in the transverse direction. In preferred embodiments, SAL 108 is a Sendust-type alloy.

Figure 4:
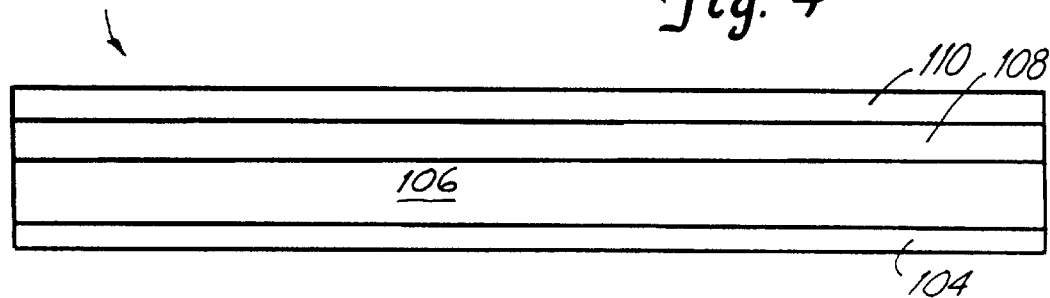

As shown in FIG. 4, spacer layer 110 is positioned on top of SAL 108. Spacer layer 110 is a non-magnetic layer of high resistivity material which is positioned between SAL 108 and MR element 112 to prevent magnetic exchange coupling between these two layers. The resistivity of spacer layer 110 is preferably substantially higher than that of MR element 112 so that the majority of the current flows through MR element 112, and increases the output voltage signal from MR element 112. In preferred embodiments, spacer layer 110 is a layer of tantalum (Ta), titanium (Ti), or nickel—iron—chromium (NiFeCr) having a resistivity of at least 100 $\mu\Omega$-cm and a thickness of between 25 and 500 Å.

Figure 5:
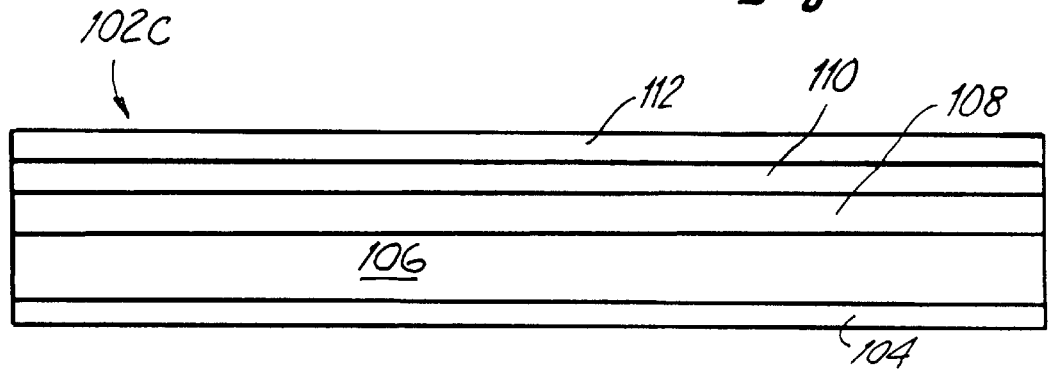

In FIG. 5, MR element 112 is positioned on top of spacer layer 110. MR element 112 is, in preferred embodiments, a layer of permalloy. Permalloy is a name commonly used to identify any of a large number of highly magnetically permeable alloys containing a combination of nickel (Ni) and iron (Fe). It must be noted that other magnetoresistive materials, such as nickel—iron—cobalt (NiFeCo) or nickel—iron—gold (NiFeAu) can be used instead of permalloy. In preferred embodiments, MR element 112 has a resistivity of less than 100 $\mu\Omega$-cm and a thickness in the range of 25 and 400 Å.

As shown in FIG. 6, a mask 130 is positioned above the central area of spacer layer 110 to protect the central area from future processing steps. In preferred embodiments, mask 130 includes PMGI 126 and photoresist 128, but is not limited to this combination of materials. The combination of PMGI and photoresist creates a pattern that provides a good "lift-off" of photoresist 128 and any other materials above photoresist 128. In addition, FIG. 6 shows that SAL 108, spacer layer 110, and MR element 112 are removed from the areas not defined by mask 130. SAL 108 is subjected to an ion-milling process to remove the portions of SAL 108 not covered by mask 130. Spacer layer 110 and MR element 112 are subjected to a reactive ion-etch process to remove the portions of spacer layer 110 and MR element 112 not covered by mask 130. There are other methods for removing film layers, not described above, that may be used. The area under mask 130 defines active region 132 and passive regions 134, 136 of the sensor as shown in FIG. 2.

In FIG. 7, underlayer material 114 is deposited over structure 102d, shown in FIG. 6. Due to the configuration of structure 102d, underlayer material 114 forms three distinct sub-materials 114a, 114b and 114c. Underlayer material 114a and 114c are deposited on top of gap layer 106 and underlayer material 114b is deposited on top of mask 130, specifically photoresist 128. Underlayer material 114 is made of cubic-titanium-tungsten with a variety of thicknesses. Cubic-titanium-tungsten establishes a good underlayer for hard-biasing material 116, which will later be shown and described.

In FIG. 8, hard-biasing material 116 is deposited over structure 102e, shown in FIG. 6. Hard-biasing material 116 forms three distinct sub-materials 116a, 116b, 116c. Hard-biasing material 116b is deposited on top of underlayer 114b, which is deposited on top of mask 130, specifically photoresist 128. Hard-biasing materials 116a and 116c are deposited on top of underlayer 114a and 114c, respectively. Hard-biasing material 116 is preferably formed from cobalt-based permanent magnet materials, but other materials can be used. In preferred embodiments, the thickness of hard-biasing material 116 at the outer edge of materials 116a and 116c is between 200 and 1000 Å.

The combination of hard-biasing material 116 and cubic-titanium-tungsten underlayer 114 helps hard-biasing material 116 achieve an appropriate longitudinal magnetic anisotropy. The longitudinal anisotropy is needed for hard-biasing material 116 to properly bias MR element 112. Cubic-titanium-tungsten underlayer 114 has an ordered crystalline formation with its easy axis of magnetization oriented generally parallel to the substrate. The crystalline formation or lattice structure of cubic-titanium-tungsten underlayer 114 more closely matches the lattice structure of hard-biasing material 116 than Sendust or other materials previously used as an underlayer for hard-biasing material 116. The closer lattice match results in a more stable hard-biasing material 116, which provides more consistent biasing of the MR element and thus a more stable MR sensor.

In FIG. 9, mask 130 is removed using a lift-off process. The lift-off process removes PMGI 126 and photoresist 128. In addition, underlayer 114b and first hard-biasing material 116b, both positioned above photoresist 128, are removed with mask 130. The combination of PMGI and photoresist creates a pattern which provides good "lift-off" of photoresist 128.

Referring back to FIG. 2, the final process steps of MR sensor 100a are shown. Cap layer 118 and contacts 120 are deposited on top of structure 102g, shown in FIG. 9. Cap layer 118 is deposited across the active region 132 of sensor 100a and the first and second passive regions 134, 136 of sensor 100a. Cap layer 118 is deposited on top of MR element 112 in the active region 132 and on top of hard-biasing material 116a and 116c in passive regions 134 and 136, respectively. Cap layer 118 protects MR element 112 from future processing steps. In preferred embodiments, cap layer 118 is a layer of tantalum (Ta), but is not limited to this material.

Contacts 120a and 120c are deposited on top of the passive regions 118a and 118c of cap layer 118. The contacts connect MR sensor 100 to external circuitry for current input.

B. Second Embodiment

FIG. 10 shows a second embodiment of the present invention, which is an MR sensor with an overlaid structure. MR sensor 100b is similar to MR sensor 100a except that MR element 112 is deposited in passive regions 134, 136 and is not limited to active region 132. As shown in FIG. 10, MR sensor 100b is positioned on top of gap layer 106, which is adjacent to bottom shield 104. Active region 132 of MR sensor 100b is defined by SAL 108, spacer layer 110, and active regions 112b' and 118b' of MR element 112' and cap layer 118', respectively. First passive region 134 of MR sensor 100b is defined by first passive regions 114a, 116a, 112a', and 118a' of underlayer 114, first hard-biasing material 116, MR element 112', and cap layer 118', respectively, and first contact 120a'. Second passive region 136 of MR sensor 100b is defined by second passive regions 114c, 116c, 112c', and 118c' of underlayer 114, first hard-biasing material 116, MR element 112', and cap layer 118', respectively, and second contact 120c'. MR element 112' (112a', 112b', 112c'), cap layer 118' (118a', 118b', 118c') and contacts 120a' and 120b' have the same properties as MR element 112, cap layer 118 (118a, 118b, 118c) and contacts 120a and 120b, respectively.

Figure 11:
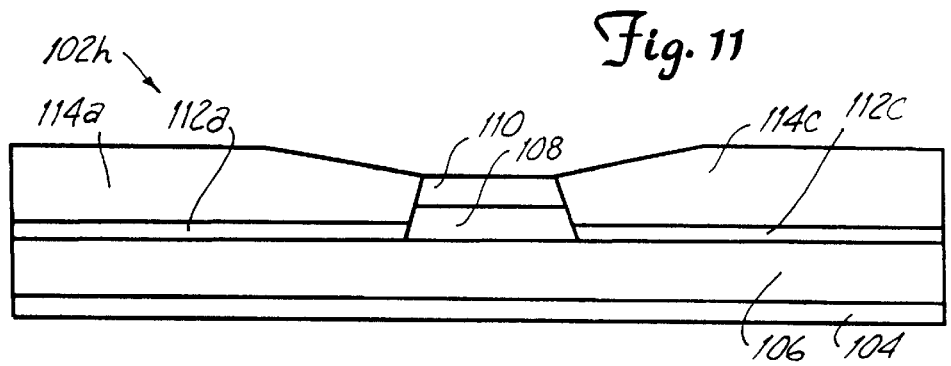

The second embodiment of making MR sensor 100 is shown in FIGS. 3–8 and FIGS. 10–11. This embodiment uses the overlaid structure of MR sensor 100 and is associated with MR sensor 100b, shown in FIG. 10. The second embodiment of the present invention follows the steps described above with respect to FIGS. 3–8, or structures 102a–102f, with the exception of when MR element 112 is deposited. Instead of depositing MR element 112 in FIG. 5, the overlaid structure deposits MR element 112' after cubic-titanium-tungsten underlayer 114 and hard-biasing material 116 have been deposited. Thus, as shown in FIG. 11, MR element 112' has not been deposited yet.

Referring back to FIG. 10, the process steps of MR sensor 100b are finished. After MR sensor 100 has achieved the structure of 102h, shown in FIG. 11, MR element 112b is deposited on top of spacer material 110, to establish active region 132 of MR sensor 100b. In addition, MR element 112a' and 112c' are deposited on top of hard-biasing material 116a and 116b, respectively, to establish first and second passive regions 134 and 136. Next, cap layer 118' (118a', 118b', 118c')is deposited on top of MR element 112 in the active and passive regions of MR sensor 100b. The final step is depositing contacts 120a' and 120b' on the passive regions of cap layer 118a' and 118b'.

In addition to the above preferred embodiments, the present invention can used with other embodiments of MR sensor 100. For example, cubic-titanium-tungsten underlayer 114 can be used with other structures of an MR sensor or in a spin-valve MR sensor. In addition, the present invention may be used in a disk application, such as thin-film disk media.

III. Advantages of the Present Invention

In preferred embodiments, transverse and longitudinal biasing is desired in active region 132 of MR sensor 100. MR element 112 or 112' is transverse biased when its magnetization vector is rotated using soft-film biasing, shunt biasing or any other compatible transverse bias technique. Longitudinal biasing is established using longitudinal hard-biasing films, such as cobalt-platinum, which suppress multiple domain formation in MR elements.

When MR element 112 or 112' is deposited, it will naturally form a magnetization vector along its long axis across the plane of the paper. A current density vector is formed in MR element 112 or 112' as current passes through MR sensor 100 during operation. The current density vector and magnetization vector initially point in the same direction. When the magnetization vector and current density vector form an angle of approximately 45 degrees, the resistance of MR element 112 or 112' will vary nearly linearly with the magnitude of magnetic flux entering MR element 112 or 112'. Thus, transverse biasing of MR element 112 or 112' is desired to obtain optimal conditions for sensing magnetic flux from a disc.

The magnetization vector is rotated by placing SAL 108 in a plane parallel to MR element 112 or 112'. The magnetic field of SAL 108 causes the natural magnetization vector of MR element 112 or 112' to be rotated approximately 45 degrees with respect to the direction of the current density vector. Spacer layer 110 is deposited between MR element 112 or 112' and SAL 108 to prevent magnetic exchange coupling between the layers, thereby permitting rotation of the magnetization vector.

The abutted junction design of MR sensor 100a is used to stabilize MR element 112. The abutted junction of MR element 112 and first hard-biasing material 116 produces magnetostatic coupling between the materials, which stabilizes MR element 112. The magnetostatic coupling places MR element 112 in a single magnetic domain structure, where MR element 112 is stabilized, but not overly stabilized such that the magnetization still causes magnetostatic coupling between MR element 112 and the SAL 108.

In the overlaid structure of MR sensor 100b, first and second passive regions 112a' and 112c' of MR element 112' are inhibited from magnetic rotation by the high coercivity, low permeability of hard-biasing material 116 through exchange coupling. The exchange coupling causes longitudinal biasing or suppression of the magnetic rotation because the geometries of MR element 112' and hard-biasing material 116 align. Inhibiting the magnetic rotation allows very little magnetic flux into first and second passive regions 112a' and 112c', which establishes a well defined reader track width and increases the absorption of flux into active region 112b'.

The amount and effectiveness of magnetostatic coupling or exchange coupling that exists between hard-biasing material 116 and MR element 112 or 112' depends upon a number of fabrication parameters. For instance, the material of MR element 112 or 112', the material of hard-biasing material 116, the thickness of MR element 112 or 112', the thickness of hard-biasing material 116, and the ratio between the thicknesses of materials all contribute to the effectiveness of exchange coupling. Deposition parameters of the layers, such as sputtering pressure and temperature, and post-deposition fabrication parameters of the layers such as ion-milling or etching, also contribute to the effectiveness of magnetostatic coupling or exchange coupling between hard biasing material 116 and MR element 112 or 112'.

In addition to thickness and deposition parameters, the underlayer of each film affects exchange coupling. Cobalt-based hard-biasing materials are inherently sensitive to the underlayer crystal texture, cleanness, and roughness of the interfacing films. The dependence of one film to the other makes fabrication difficult. A desirable underlayer 114, such as amorphous Sendust or chromium, is usually chosen to control the characteristics of hard-biasing material 116. Cubic-titanium-tungsten, however, provides better product and process results when combined with hard-biasing material 116.

MR element 112 or 112' can "fracture" into multiple magnetic domains when it is exposed to an external magnetic field. To maximize the MR sensor's output and stability, it is desirable to maintain the NM element in a single domain state through exchange coupling or magnetostatic coupling. The magnetic field of hard-biasing material 116 should be large enough to ensure a single domain configuration, yet small enough so as not to change the linearity and signal amplitude of the resultant MR signal. Thus, the stability of hard-biasing material 116 has a substantial affect on the reliability of MR sensor 100, whether the abutted structure, overlaid structure, or another type of structure is used to build MR sensor 100.

The lattice structure of cubic-titanium-tungsten used for underlayer 114 closely matches the lattice structure of cobalt-based hard-biasing material 116. This allows the two layers to form a stronger bond. This bond increases the coercivity of cobalt-based, hard-biasing material 116. In other words, when hard-biasing material 116 is combined with cubic-titanium-tungsten underlayer 114, it is less affected by an external magnetic field. In addition, cobalt-based, hard-biasing material 116 achieves a better longitudinal magnetic anisotropy. Thus, the magnetic vector of hard-biasing material 116 stays within the plane parallel to the substrate, which also increases the stability of hard-biasing material 116.

Chromium can also be used to increase the stability of cobalt-based, hard-biasing material 116. However, chromium needs to be deposited at elevated substrate temperatures to achieve the desired bond with the hard-biasing material. Depositing chromium at elevated substrate temperatures in typical sputtering systems has severe limitations in a volume production environment. Cubic-titanium-tungsten underlayer 114 can be deposited at normal temperatures; therefore, it enhances both MR sensor 100 and the process of making MR sensor 100.

In operation, the air bearing surface of MR sensor 100 is positioned adjacent a magnetic storage medium. The magnetic storage medium is moved so that the magnetic information located in the storage medium passes active region 132 of the MR sensor 100. A sense current flows through MR element 112 or 112'. It is desirous to have an appropriate amount of sense current flow through magnetic layer 112 or 112' of MR sensor 100, in order to more effectively read information stored on the magnetic storage medium. Once the sense current has flowed through MR sensor 100, auxiliary circuitry reads the voltage, which represents the data stored on the magnetic storage medium.

MR sensor 100 can be affected by external magnetization, which affects the operation of MR sensor 100. Cubic-titanium-tungsten underlayer 114 forms a strong bond with cobalt-based, hard-biasing material 116, which stabilizes hard-biasing material 116. This allows hard-biasing material 116 to more consistently bias MR element 112 or 112', which in turn stabilizes MR sensor 100.

Although the present invention has been described with reference to preferred embodiments, workers skilled in the art will recognize that changes may be made in form and detail without departing from the spirit and scope of the invention.

What is claimed is:

1. A magnetoresistive read sensor comprising:

a gap layer;

a soft adjacent layer positioned on a center region of the gap layer, thereby forming an active region, where first and second outside regions of the gap layer are separated by the center region;

a spacer layer positioned on the soft adjacent layer in the active region;

a cubic-titanium-tungsten underlayer on the first and second outside regions of the sensor, thereby forming first and second passive regions separated by the active region;

a hard-biasing material positioned on the cubic-titanium-tungsten underlayer in the first and second passive regions; and a magnetoresistive layer positioned on the spacer layer in the active region.

2. The magnetoresistive read sensor of claim 1 and further comprising a cap layer positioned on the magnetoresistive layer in the active region and on the hard-biasing material in the first and second passive regions.

3. The magnetoresistive read sensor of claim 2 and further comprising a plurality of contacts positioned on the cap layer in the first and second passive regions.

4. The magnetoresistive read sensor of claim 1 wherein the magnetoresistive layer is formed from a soft-magnetic material having a resistivity less than 100 $\mu\Omega$-cm.

5. The magnetoresistive read sensor of claim 1 wherein the spacer layer is formed from a non-magnetic material having a resistivity of at least 100 $\mu\Omega$-cm.

6. The magnetoresistive read sensor of claim 1 wherein the soft adjacent layer is formed from a soft-magnetic material having a resistivity of at least 100 $\mu\Omega$-cm.

7. The magnetoresistive read sensor of claim 1 wherein the magnetoresistive layer is positioned on the spacer layer and the hard-biasing material, thereby extends over the active region and the first and second passive regions.

8. The magnetoresistive read sensor of claim 7 and further comprising a cap layer positioned on the magnetoresistive layer in the active region and the first and second passive regions.

9. The magnetoresistive read sensor of claim 8 and further comprising a plurality of contacts positioned on the cap layer in the first and second passive regions.

10. The magnetoresistive read sensor of claim 7 wherein the magnetoresistive layer is formed from a soft-magnetic material having a resistivity less than 100 $\mu\Omega$-cm.

11. The magnetoresistive read sensor of claim 7 wherein the spacer layer is formed from a non-magnetic material having a resistivity of at least 100 $\mu\Omega$-cm.

12. The magnetoresistive read sensor of claim 7 wherein the soft adjacent layer is formed from a soft-magnetic material having a resistivity of at least 100 $\mu\Omega$-cm.

* * * * *